United States Patent [19]

Doi et al.

[11] Patent Number: 4,697,644
[45] Date of Patent: Oct. 6, 1987

[54] CULTIVATOR NAIL SUPPORTING STRUCTURE

[75] Inventors: Sadao Doi; Tohru Yamada; Shungo Matsumoto; Taizo Yamamoto, all of Kohchi, Japan

[73] Assignee: Taiyo Tanko Co., Ltd., Kohchi, Japan

[21] Appl. No.: 815,626

[22] Filed: Jan. 2, 1986

[30] Foreign Application Priority Data

Mar. 29, 1985 [JP] Japan .................. 60-44964[U]

[51] Int. Cl.[4] .................. A01B 33/02; A01B 33/14
[52] U.S. Cl. .................. 172/123; 172/91; 172/545; 403/361
[58] Field of Search .......... 172/91, 96, 122, 145, 172/540, 548, 556, 545; 403/361, 383, 378, 379; 301/104, 64 SH, 64 R

[56] References Cited

U.S. PATENT DOCUMENTS

| | | | |
|---|---|---|---|
| 797,443 | 8/1905 | Lindgren | 172/545 |
| 2,054,129 | 9/1936 | Kelsey | 172/96 |
| 2,071,259 | 2/1937 | Hecht | 301/104 X |
| 2,088,956 | 8/1937 | Hecht | 301/104 |
| 3,199,609 | 8/1965 | Robinson | 172/556 |
| 3,246,704 | 4/1966 | Honda | 172/96 |

*Primary Examiner*—Richard J. Johnson
*Attorney, Agent, or Firm*—Samuels, Gauthier, Stevens & Kehoe

[57] ABSTRACT

There is provided a cultivator blade supporting structure. The structure comprises at least one cultivator blade comprising a shank and a blade portion; at least one blade holder having a hollow sleeve for removably receiving the shank of the cultivator blade; and a rotational driving shaft to which the blade holder is fixed, wherein at least a part of the sleeve for receiving the shank of the cultivator blade comprises confronting oppositely inclined interior faces between which the shank is wedged when the cultivator blade is rotated to cultivate the ground.

3 Claims, 20 Drawing Figures

CULTIVATOR NAIL SUPPORTING STRUCTURE

BACKGROUND OF THE INVENTION

1. Field of the Invention

The present invention relates to a cultivator blade supporting structure, in which a blade of a cultivator can easily be attached to and removed from the structure.

2. Description of the Prior Art

Blades of a cultivator are fitted to the cultivator by inserting a held portion located at one end of each blade into each of a plurality of blade holders projecting from the periphery of a rotation shaft for rotating the blades. As an when required, all the blades attached to the blade holders are removed and replaced with other blades which have different blade shapes.

FIGS. 1 and 2 show a prior art cultivator blade supporting structure. On a periphery 2 of a cultivator blade rotation shaft (hereinafter called the "rotation shaft") 1, there projects a blade holder 3. The cross section of a hollow sleeve 4 of the blade holder 3 perpendicular to an axis X—X of the blade holder 3 has a rhombic shape or a shape of two wedges facing each other. Into the sleeve 4, a stem 6 located at one end of a cultivator blade 5 is inserted. The cross section of the stem 6 has a rhombic shape complimenting the cross section of the sleeve. The stem 6 is fitted to the blade holder 3 with a pin 7 which extends in parallel relationship with the rotation shaft through the blade holder. The stem of the cultivator blade 5 is pivotable around the pin 7.

If the rotation shaft 1 rotates in a direction indicated by an arrow "m" shown in FIG. 3, the cultivator blade 5 is bodily rotated in the same direction. When the inner side of the other end (not shown) of the cultivator blade) 5 hits the ground, the cultivator blade 5 is turned in a direction indicated by an arrow "n" around the pin 7. As a result, the stem 6 in the sleeve 4 is turned with respect to the blade holder 3 in a direction opposite to the rotating direction of rotation shaft 1. The upper end of the stem 6 (FIG. 3) is moved upwardly toward an upper internal edge of the sleeve 4, while a lower end 10 on blade side of the stem is moved toward a lower end portion 11 of the sleeve 4. At both end portions, the wedge shaped edges of the stem 6 are pushed into the wedge shaped portions of the sleeve 4.

A contacting state of the side faces of sleeve 4 and the side faces of stem 6 under the above-mentioned situation is shown in FIGS. 5 and 6 which are enlarged views of the left half of FIG. 3. An upper end 8-1 of an edge 12 of the stem 6 moves to a position 8-2. Namely, in FIG. 6, a corner portion A of the upper end 8-1 moves to a position B, while a corner portion C on the center side moves to a postion C-1. Therefore, a square shape ADFE shown in FIG. 5 is indicated by a rectangular shape BDCA in FIG. 6. A portion outside a face G of the wedge shape portion of sleeve 4, i.e., about the half of the square shape ADFE is in planar contact with the wedge shape portion of the hollow portion.

Initially, the edge 12 of stem 6 contacts the sleeve due to the resilient deformation of the blade holder, but, due to the abrasion of the contacting position, the contacting point is gradually increased to make planar contact as shown in FIG. 6.

The above-mentioned situation is also caused on the right-lower side of pin 7. According to the increase of the area of planar contact, the cultivator blade must be struck in the direction of arrow Z in FIG. 3 to dislodge the stem from the sleeve. However, when this is done, the stem is forced past the neutral position shown in FIG. 1 to a wedged position as shown in FIG. 4. Thus, the cultivator blade must be angularly reciprocated several times before it can be brought to the neutral position of FIG. 1, thereby enabling it to be removed from the holder.

SUMMARY OF THE INVENTION

An object of the present invention is to provide a cultivator blade supporting structure which facilitates removal of the blade in a short time.

In order to accomplish this object, the present invention provides a cultivator blade supporting structure comprising at least one blade holder having a hollow sleeve in which a cultivator blade is inserted and held, said sleeve having slanted inner faces which resiliently and strongly hold the cultivator blade when the cultivator blade is subjected to external force and continue holding the cultivator blade even if the external force is removed, with the retaining action of the slanted inner faces increasing in proportion to increases in the level of the external force, and with the end face of the sleeve bearing against the end of the cultivator blade when a high level of external force is applied to the blade, thereby protecting the slanted inner faces from being damaged due to the application of force exceeding the elastic limit of the material of the blade holder.

BRIEF DESCRIPTION OF THE DRAWINGS

These and other objects, features and advantages of the present invention will become apparent from the following description of preferred embodiments taken in conjunction with the accompanying drawings in which.

DETAILED DESCRIPTION OF THE EMBODIMENTS

Figure 1:
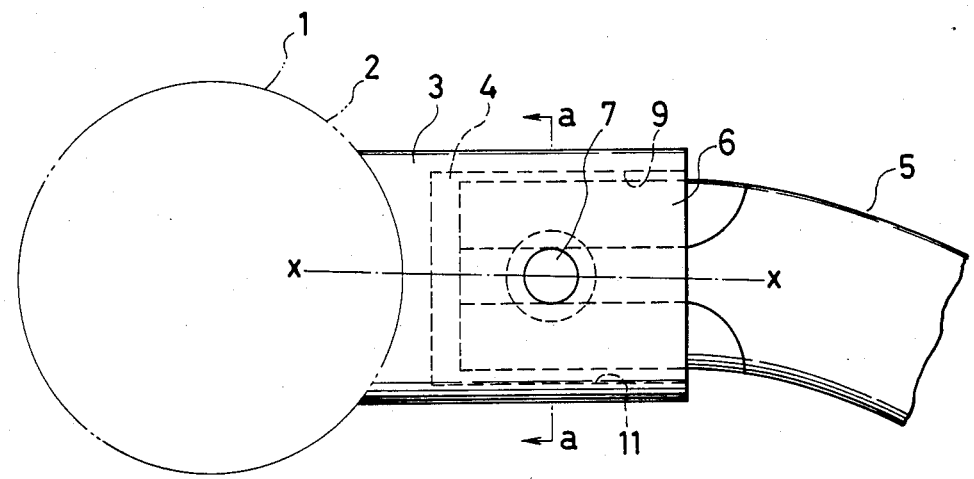
FIG. 1 is a side view showing a prior art blade holder.
Figure 2:
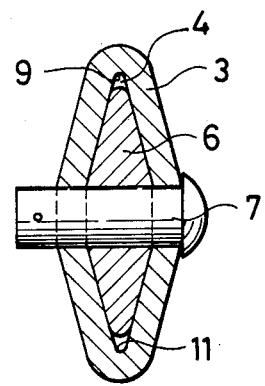
FIG. 2 is a cross-sectional view taken along the line 2—2 shown in FIG. 1.
Figure 3:
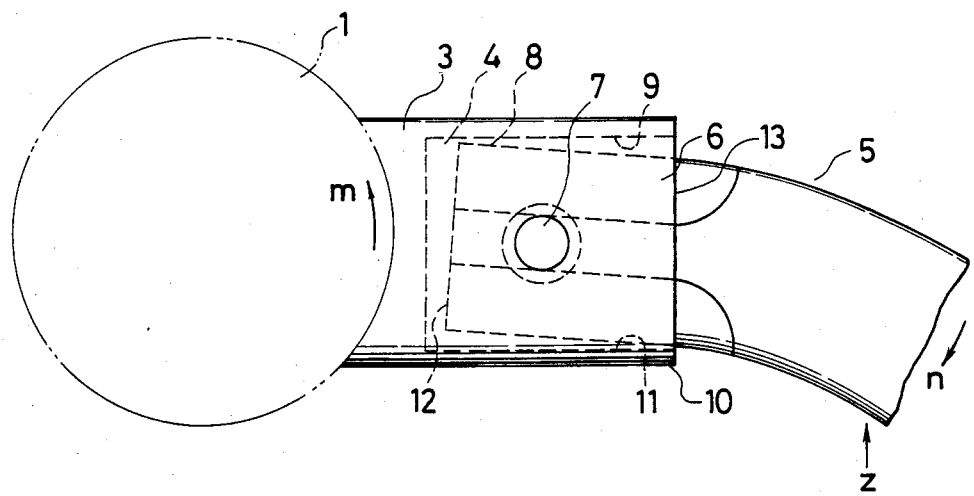
FIGS. 3 and 4 are views describing the operation of the prior art blade holder shown in FIG. 1.
Figure 4:
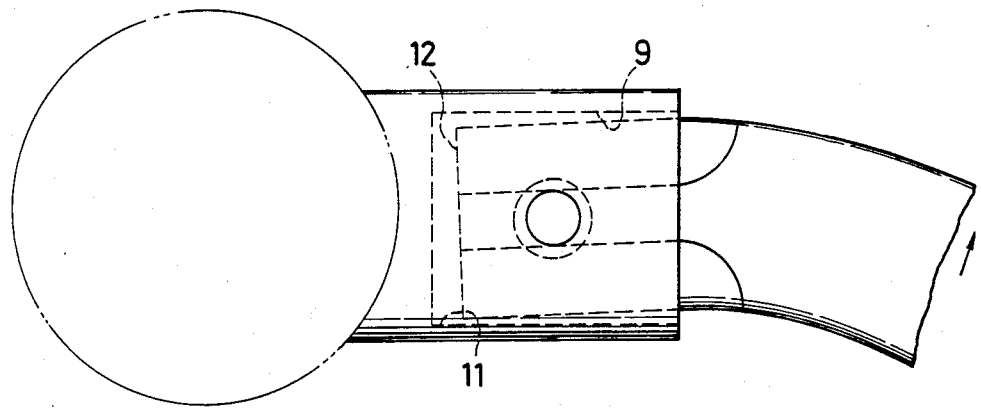
Figure 5:
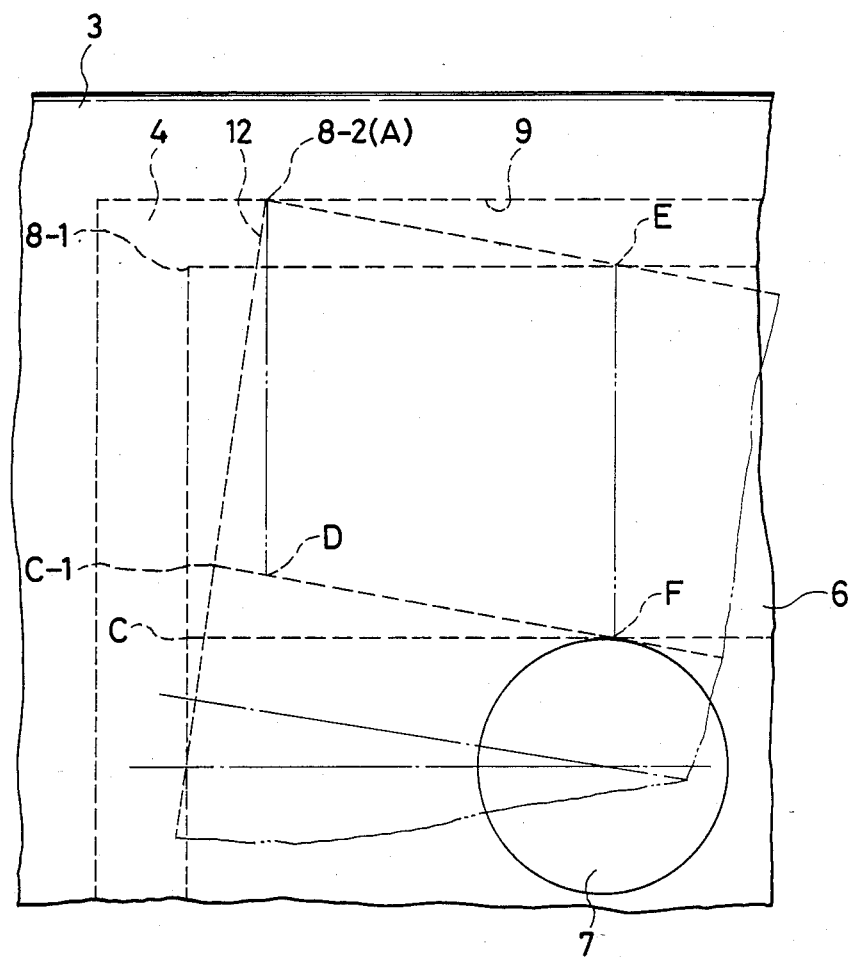
FIGS. 5 and 6 are views describing the contacting state of a side face of the stem and a wedge shape portion of the sleeve at the time of rotation of the stem of the prior art holder shown in FIG. 1.
Figure 6:
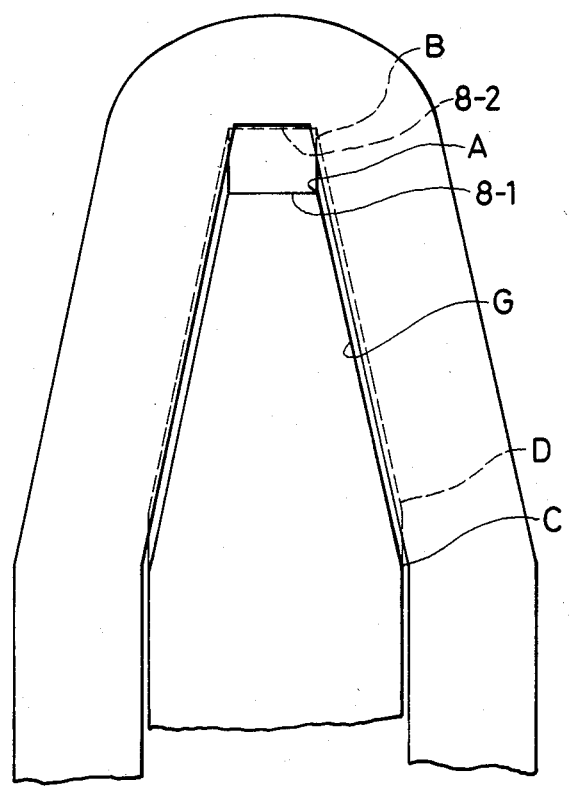
Figure 7:
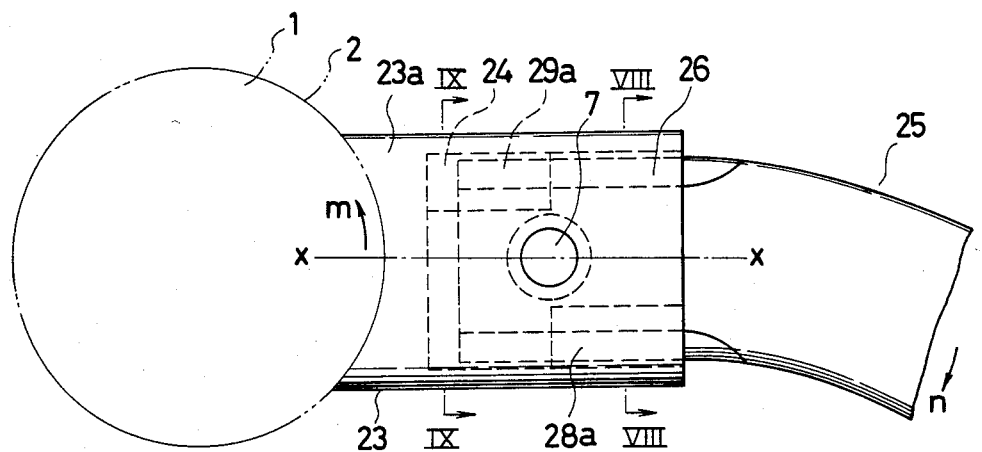
FIG. 7 is a side view showing a first embodiment of the present invention.
Figure 8:
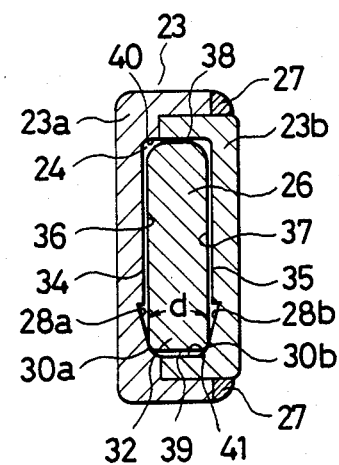
FIGS. 8 and 9 are cross-sectional views taken along the lines 8—8 and 9—9 respectively of FIG. 7.
Figure 9:
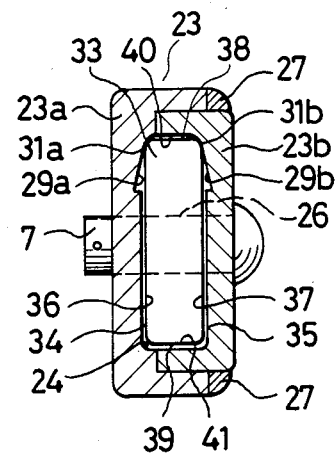

Referring to FIGS. 7-9, and as shown in FIG. 1, the numerals 1, 2 and 7 represent a cultivator blade rotation shaft, a periphery thereof, and a stopper pin respectively. The numeral 23 represents the blade holder which is constituted by channel members 23a and 23b facing each other and welded together at 27. The numeral 24 is a cavity of the blade holder 23; 25 is a cultivator blade; and 26 a shank located at one end of the cultivator blade 25. When the cultivator blade 25 is rotated around the pin 7 in a direction (arrow "n") opposite to the direction of rotation of the rotation shaft 1 (arrow "m"), the shank 26 abuts against the interior of cavity 24 (see FIG. 3). With reference in particular to FIGS. 8 and 9, it will be seen that confronting oppositely inclined interior faces 28a and 28b are located at the bottom of the cavity adjacent to its mouth, and that confronting oppositely inclined interior faces 29a and 29b are similarly located at the top of the cavity adjacent to its inner end. The faces 28a,28b and 29a,29b have intersecting angles of approximately 45°. The blade shank has a generally rectangular cross-sectional shape with rounded edges and during the above-described reverse rotational movement, portions 32, 33 of the shank contact the faces 28a,28b and 29a,29b respectively at points 30a,30b and 31a,31b.

The remainder of the interior of cavity 24 is defined by parallel faces 36,37 located adjacent to shank side faces 34,35, and by flat faces 40 and 41 which are parallel to the upper and lower shank surfaces 38,39. With reference to FIG. 8, it will be seen that during reverse rotation of the blade shank, the cavity surface 41 serves as a stop on the right side of the pin 7 as viewed in FIG. 7. Further, as shown in FIG. 9 on the left side of pin 7, the end face 40 of the cavity serves as another stop. When the cultivator blade is strongly rotated in the direction of arrow "n", the upper shank surface 38 abuts against the end face 40 of the cavity, while the lower shank surface 39 abuts against the end face 41 of the cavity. In this case, the size of the gap between the surfaces 38 and 40, and the size of the gap between the surfaces 39 and 41 is selected so that the holding pressure on the shank portions 32 and 33 does not exceed a predetermined value. When the cultivator blade is rotated around the pin 7 in the same direction as the rotational direction of the rotation shaft, the upper shank surfaces 38 abuts against the flat end face 40 of the cavity on the right side of the pin 7 as shown in FIG. 7, while, on the left side of the pin 7, the lower shank surface 39 abuts against the flat end face 41 of the cavity.

According to the first embodiment of the present invention, the shank portions 32 and 33 are wedged with point contact between the interior inclined surfaces 28a,28b and 29a,29b when the cultivator blade is rotated together with the rotation shaft to cultivate the ground so that the blade may be firmly fitted to the blade holder without play. Since the pressure holding state is substantially the point contacting state, the cultivator blade can be removed in a short time in comparison with the planar contacting state.

Figure 10:
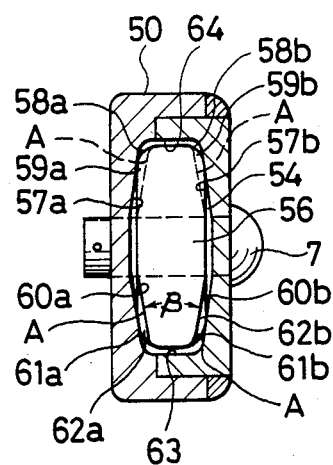
FIG. 10 is a cross-sectional view showing a second embodiment of the present invention.
Figure 11:
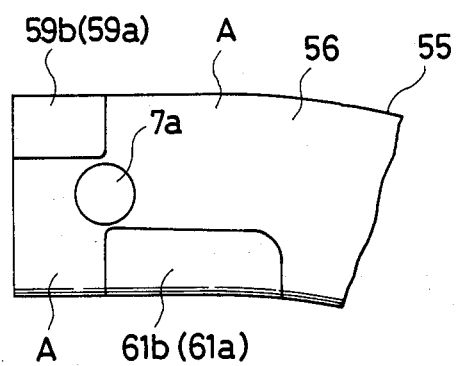
FIG. 11 is a side view showing the stem shown in FIG. 10.

FIGS. 10 and 11 show the second embodiment of the present invention. FIG. 10 is a cross-sectional view taken along a line associated at the same position as the line 9—9 shown in FIG. 7. FIG. 11 is a side view showing the blade shank depicted in FIG. 10.

In this embodiment, the cross-sectional configuration of the blade holder remains substantially the same as that of the previously described embodiment. However, the blade shank differs in that its upper edges on the left side of the pin hole 7a shown in FIG. 11 have projections 59a and 59b which have arcuate portions 58a and 58b respectively contacting through contacting points the faces 57a and 57b respectively of the wedge shape portion of the upper side of the cavity, while, on the right side of the pin hole 7a, the held portion 56 has projections 62a and 62b which have arcuate portions 61a and 61b respectively contacting through contacting points the faces 60a and 60b respectively of the wedge shape portions of the lower side of the cavity, thereby constituting pressure supporting portions. The portions other than the projections 59a and 59b, and 62a and 62b of the blade shank 56 are spaced apart from the inner surface of the cavity portion with a proper gap as shown in FIG. 10 to constitute a fitting pressure releasing portion A together with a face which is in parallel with said inner surface.

In this embodiment, the intersection angle β of both faces of the wedge shape portion is about 30°. The lower side end face 63 and upper side end face 64 of the cavity are flat and serve as stops when the blade is rotated in a direction opposite to the rotational direction of the rotation shaft, and abutting positions when the blade is rotated in the same direction as the rotational direction of the rotation shaft.

Similar to the first embodiment, the second embodiment enables the cultivator blade to be easily removed from the blade holder in a short time due to the existence of the fitting pressure releasing portion A.

The present invention is not limited by the above-mentioned embodiments. For instance, the cultivator blade can be provided with a wedge shape portion, while the blade holder can be provided with an acutting portion which abuts locally aginst the wedge shape portion to constitute a fitting pressure supporting portion. In this case, a side opposite to the rotational direction of the cultivator blade 56 is formed not to abut against the blade holder 50 to constitute a fitting pressure releasing portion with respect to the fitting pressure supporting portion.

Figure 12:
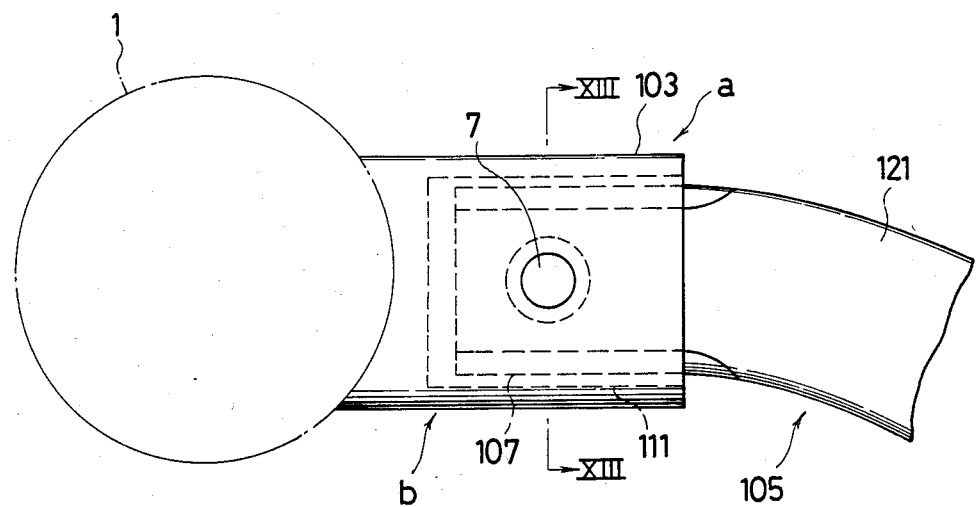
FIG. 12 is a side view showing the main part of a cultivator blade supporting structure according to a third embodiment of the present invention.
Figure 13:
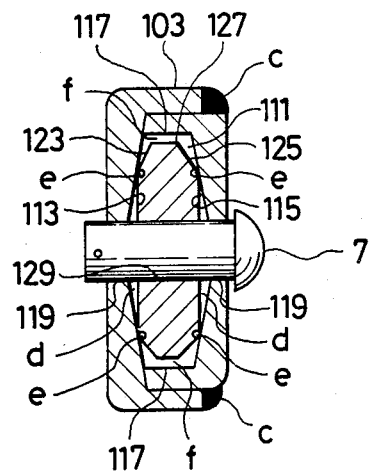
FIG. 13 is a cross-sectional view taken along the line 13—13 of FIG. 12.

FIG. 12 is a side view showing the main part of a cultivator blade supporting structure according to the third embodiment of the present invention. FIG. 13 is a cross sectional view taken along the line 13—13 shown in FIG. 12.

The periphery of the rotation shaft 1 is provided radially with a plurality of blade holders 3 which are welded thereto spaced properly apart from each other.

Each blade holder 3 is constituted by overlapping the upper and lower end faces of one channel like steel plate with the upper and lower end faces of another channel like steel plate. The peripheral ends of the blade holder 3 are formed solidly with welded portions C. A holder cavity 111 of the blade holder 3 has fitting pressure supporting portions 113 and 115. The thickness of the side faces of the cavity 111 becomes thinner from the overlapped end faces towards a stopper pin hole 119 which is provided at an intermediate height in symmetrical positions on the right and left side faces of the cavity 111. The cavity 111 is provided with stop surfaces 117 which are formed on faces being in parallel with the pin hole 119 on the sides of the overlapped end faces of the fitting pressure supporting portions 113 and 115.

The cultivator blade 5 which is inserted freely removable into the cavity hole 111 comprises a blade shank 107 and a blade portion 121 (partly shown in the figures).

The intermediate body of the blade shank 107 on the right and left side portions are formed with parallel surfaces which are spaced apart from the fitting pressure supporting portions 113 and 115 of the blade holder 3 with a gap "d". The upper and lower ends of said parallel surfaces terminate at inclined faces 123 and 125 which have angles of inclination larger than those of the fitting pressure supporting portions 113 and 115 of the blade holder 3. The top and bottom ends of the parallel surfaces are formed in parallel surfaces 127, each having a width narrower than the width of the parallel surface of the stop surfaces 117 of the blade holder 3. When a stopper pin 7 is inserted from the pin hole 119 of the blade holder 3 into the pin hole 129, the cultivator blade 5, with contacting portions "e" which are intersections of the parallel faces and the inclined faces 123 and 125, abuts against the fitting pressure supporting portions 113 and 115 adjacent to the upper and lower ends of the holder hole 111. Between the parallel surfaces 127 on the upper and lower ends of the blade shank 107 and the stopper portion 117 of the blade holder 3, there is a gap "f".

The shank 107 of the cultivator blade 5 is inserted into the cavity 111 of the blade holder 3, and the stopper pin 7 is inserted into the pin hole 119 of the blade holder 3 and the pin hole 129 of the cultivator blade 5 so that the cultivator blade 5 is removably fixed to the blade holder 3. A cotter pin (not shown) is fitted to the stopper pin 7 to prevent the accidental removal thereof.

The operation of the embodiment 3 will be described. A cultivator is driven to rotate the cultivator shaft 1. When the cultivator blade 5 starts to cultivate the ground, the cultivator blade 5 receives reaction force from the ground through the blade portion 121. As a result, the shank 107 is rotated around the stopper pin 7 relative to the blade holder 3 so that the contacting portion of the face side "a" and the contacting portion of the back side "b" are pressed against the fitting pressure supporting portions 113 and 115 respectively and supported. If the fitting pressure supporting portions 113 and 115 receive predetermined pressure, the parallel faces 125 of the face side "a" and the back side "b" of the shank 107 are stopped by the front and rear stop portions 117 of the blade holder 3, and thus they are supported by the fitting pressure of the fitting pressure supporting portions 113 and 115 and the resistance pressure of the stop portions 117. Due to the press caused by the reaction force, the fitting pressure supporting portions 113 and 115 of the cavity 111 at the intermediate height portion, which has thick wall, near the stopper pin 7 of the blade holder 3 are resiliently enlarged toward the axial direction of the stopper pin 7. In this way the shank 107 can be strongly and surely supported in the blade holder 3 without using fitting tools such as a bolt and nut.

Figure 14:
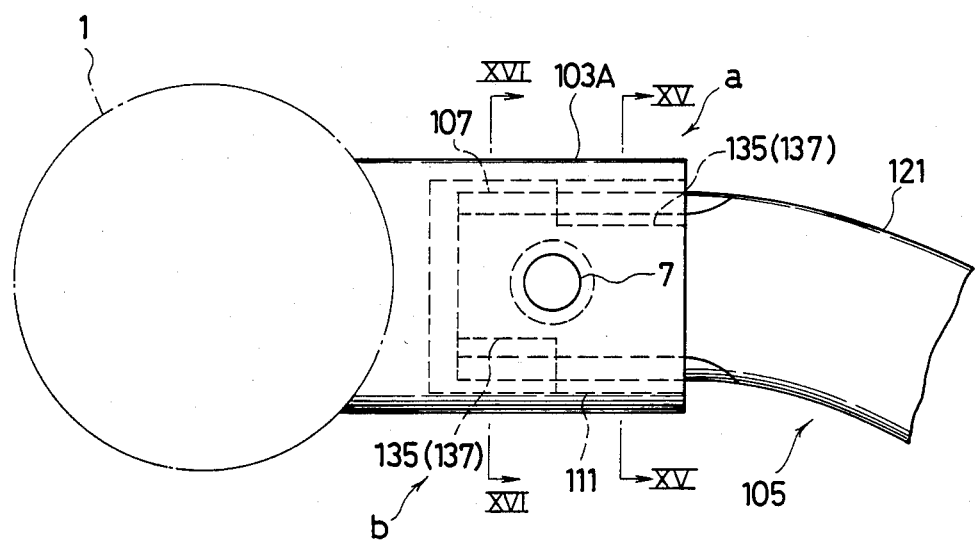
FIG. 14 is a side view showing the main part of a cultivator blade supporting structure according to a fourth embodiment of the present invention.
Figure 15:
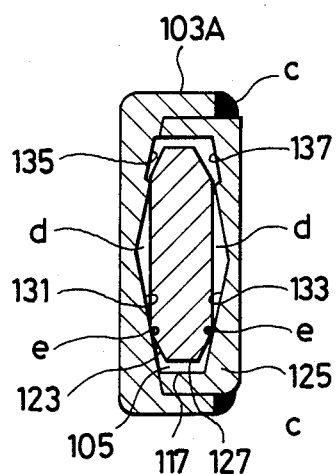
FIG. 15 is a cross-sectional view taken along the line 15—15 of FIG. 14.
Figure 16:
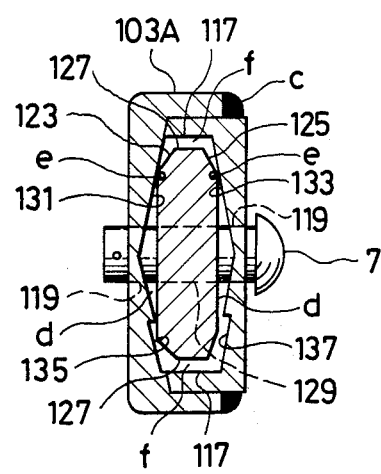
FIG. 16 is a cross-sectional view taken along the line 16—16 of FIG. 14

FIGS. 14 and 16 show the fourth embodiment of the present invention.

Fitting pressure supporting portions 131 and 133 comprise oppositely inclined faces formed on the side wall of the cavity 111. At the front end portion of the face side "a" and at the base portion of the back side "b" of the fitting pressure supporting portions 131 and 133, there are provided fitting pressure releasing portions 135 and 137, which do not apply the fitting pressure, between the blade holder 3A and the shank 107 of the cultivator blade 5.

Similar to the third embodiment, the cultivator shaft 1 is rotated to cultivate the ground by the cultivator blade 5 which receives the reaction force from the ground through the blade portion 121. Due to this, the shank 107 rotates relative to the blade holder 3A so that the shank 107 is supported by the fitting pressure of the fitting pressure supporting portions 131 and 133 of the blade holder 3A and the resistance pressure of the stop portion 117. To remove the cultivator blade 5, which is supported by the fitting pressure and the resistance pressure, from the blade holder 3A, the cultivator blade 5 is hit by a wooden hammer, etc., to rotate the shank 107 in the reverse direction to release the fitting pressure of the fitting pressure supporting portions 131 and 133 of the blade holder 3A. In this case, the shank 107 on the opposite side of the cultivator blade 5 is sometimes pressed against the blade holder 3A and caught therein. However, the blade holder 3A according to the pressure invention is provided with the fitting pressure releasing portions 135 and 137 by which the shank 107 will not be caught by the blade holder 3A if the shank 107 is rotated in the opposite direction. As a result, the cultivator blade is easily removed.

Figure 17:
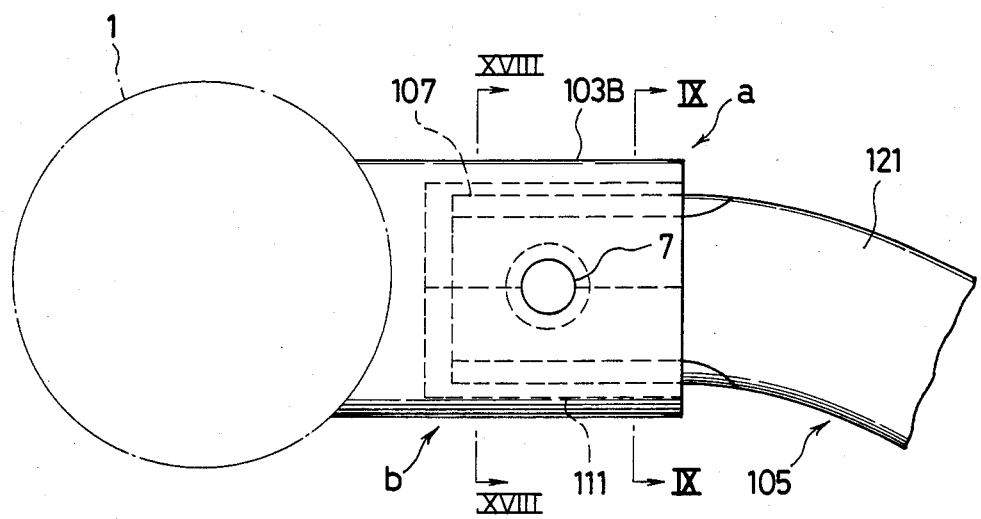
FIG. 17 is a side view showing the main part of a cultivator blade supporting structure according to a fifth embodiment of the present invention.
Figure 18:
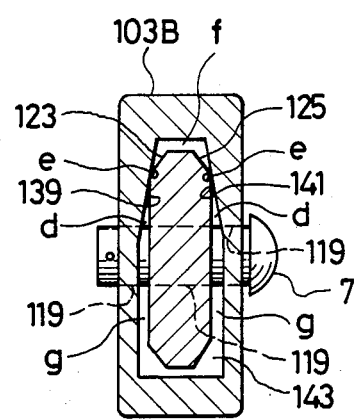
FIG. 18 is a cross-sectional view taken along the line 18—18 of FIG. 17.
Figure 19:
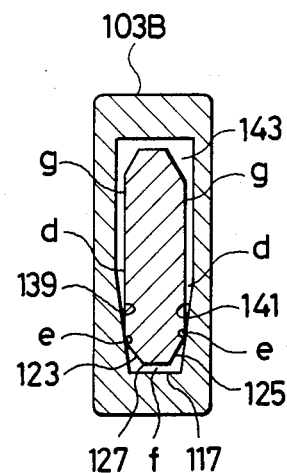
FIG. 19 is a cross-sectional view taken along the line 19—19 of FIG. 17.

FIGS. 17 to 19 show the fifth embodiment of the present invention.

The blade holder 3B is provided, on its front side with a centrally located pin hole 119, with fitting pressure supporting portions 139 and 141 on the back side "b", and, on the face side "a", with a fitting pressure releasing portion 143 which comprises parallel faces having a proper gap "g" from the parallel faces of the blade shank 107.

Similar to the fourth embodiment, the held portion 107 will not be caught by the blade holder 3B when the shank 107 is rotated in an opposite direction so that the cultivator blade 5 may easily be removed.

Figure 20:
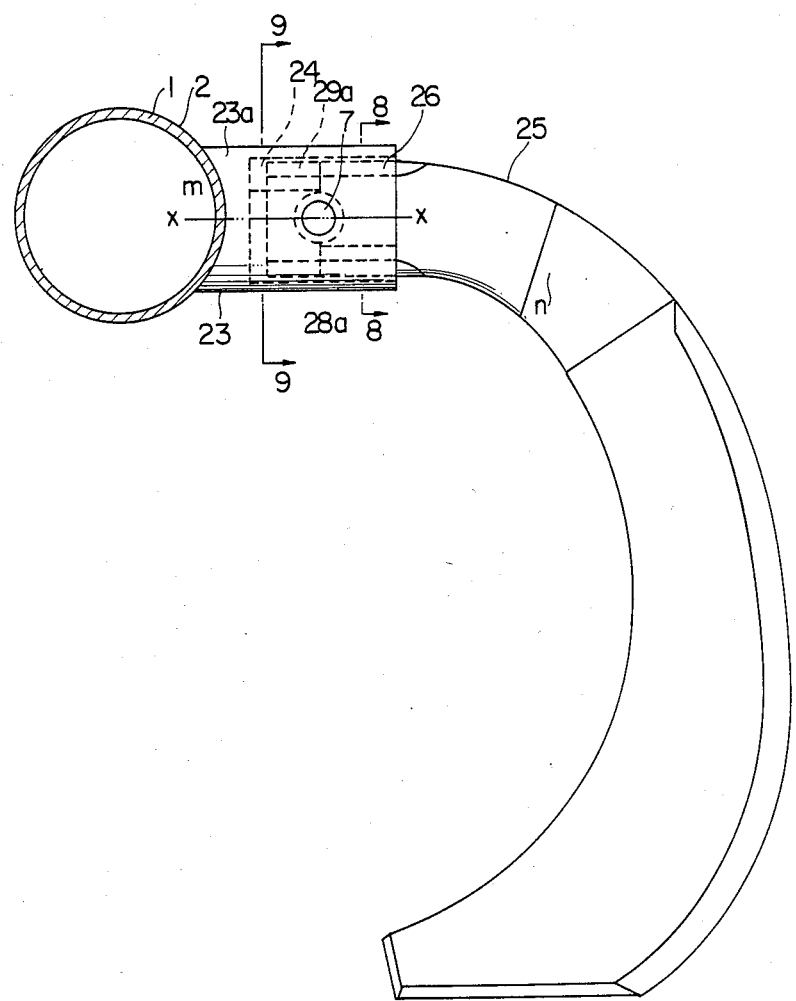
FIG. 20 illustrates the relationship of the entire cultivator blade to the blade holder and cultivator shaft.

As mentioned in the above, the present invention provides a cultivator blade supporting structure which resiliently and strongly holds the cultivator blade when the cultivator blade receives external force and continues holding the cultivator blade even if the external force is removed, and holds stronger the cultivator blade according to the increase of the external force. Further, the structure can receive the end of the cultivator blade when the external force is exceedingly applied to the bade, thereby protecting the inclined faces from being damaged due to the application of force exceeding the elastic limit of the material of the blade holder. Due to the fitting force releasing portions provided for the structure, the cultivator blade can easily be fitted to and removed from the blade holder. FIG. 20 illustrates the complete blade in the cultivator shaft.

What is claimed is:

1. A supporting structure for a cultivator blade of the type having a blade portion with an integral shank, said supporting structure comprising:
 a rotatable driving shaft;
 a blade holder fixed to and extending radially from said shaft, said holder having an elongated cavity suitably dimensioned and configured to receive said shank therein;

a pin extending through aligned apertures in said holder and a blade shank received in said cavity, said cavity and said shank being dimensioned to accommodate limited rotational movement of said shank relative to said holder about the axis of said pin;

said cavity being defined in part by two sets of confronting oppositely inclined pressure surfaces and by confronting parallel stop surfaces, the said two sets of pressure surfaces being arranged in a non-opposed relationship on opposite sides respectively of both the longitudinal axis of said cavity and the axis of said pin at locations such that upon rotation of said shank about the axis of said pin in a direction opposite to the direction of rotation of said shaft, first portions of said shank will rotate between and into wedged engagement with said sets of inclined pressure surfaces, with the extent of rotation of said shank relative to said holder being limited by the abutment of second portions of said shank against said stop surfaces.

2. The supporting structure of claim 1 wherein the arrangement of said surfaces is such that rotation of said shank relative to said holder in the same direction as the rotational direction of said shaft will cause said first portions of said shank to rotate out of wedged engagement with said inclined pressure surfaces.

3. The supporting structure of claim 2 wherein said blade shank has a rectangular cross sectional configuration with parallel side surfaces extending in perpendicular relationship to parallel edge surfaces, said first and second shank portions lying respectively on said side and edge surfaces.

* * * * *